(12) United States Patent
Falk

(10) Patent No.: US 11,731,228 B2
(45) Date of Patent: Aug. 22, 2023

(54) DRILL DUST RECEPTACLE AND BLANK THEREFORE

(71) Applicant: DUSTZERO SWEDEN AB, Stockholm (SE)

(72) Inventor: Henrik Falk, Stockholm (SE)

(73) Assignee: DUSTZERO SWEDEN AB, Stockholm (SE)

( * ) Notice: Subject to any disclaimer, the term of this patent is extended or adjusted under 35 U.S.C. 154(b) by 660 days.

(21) Appl. No.: 16/341,159

(22) PCT Filed: Oct. 11, 2017

(86) PCT No.: PCT/SE2017/051000
§ 371 (c)(1),
(2) Date: Apr. 11, 2019

(87) PCT Pub. No.: WO2018/070925
PCT Pub. Date: Apr. 19, 2018

(65) Prior Publication Data
US 2020/0180094 A1    Jun. 11, 2020

(30) Foreign Application Priority Data

Oct. 13, 2016    (SE) .................... 1651342-6

(51) Int. Cl.
*B23Q 11/02*    (2006.01)
*B23Q 11/00*    (2006.01)
*B08B 15/04*    (2006.01)

(52) U.S. Cl.
CPC .......... *B23Q 11/0071* (2013.01); *B08B 15/04* (2013.01); *B23Q 11/0053* (2013.01)

(58) Field of Classification Search
CPC ............ B23Q 11/0071; B23Q 11/0053; B23Q 11/0042; B23B 2270/30
See application file for complete search history.

(56) References Cited

U.S. PATENT DOCUMENTS

| 4,415,100 A | 11/1983 | Hutchinson |
| 5,911,324 A | 6/1999 | Hammer |

FOREIGN PATENT DOCUMENTS

| DE | 8500252 U1 | 8/1985 |
| DE | 19719484 A1 | 11/1998 |

(Continued)

OTHER PUBLICATIONS

XPO54980692, Handimania "2 simple hacks for drilling without making a mess", https://www.youtube.com/watch?v=A_hfqS96lco.

(Continued)

*Primary Examiner* — Alan Snyder
(74) *Attorney, Agent, or Firm* — Renner, Otto, Boisselle & Sklar, LLP

(57) ABSTRACT

A drill dust receptacle (1) for collecting drill dust (2) formed of a blank (4) of foldable sheet material and configured to be detachably attached to a surface, wherein the drill dust receptacle (1) comprises a receptacle portion (1.1) for holding drill dust having an upper edge (50) and a pointed bottom (40) and further comprises a front panel (20), a back panel (21) and a first and a second side section (22, 23), coupled to each other by a joint (60) such that the front panel (20) may be folded out from the back panel (21) and that; the joints (60) are formed by folds (31, 32, 33) in the foldable sheet material wherein that the receptacle portion (1.1) is formed of a rectangular receptacle section (10) of the blank (4) of foldable sheet material.

10 Claims, 4 Drawing Sheets

(56) References Cited

FOREIGN PATENT DOCUMENTS

| DE | 20021749 U1 | 5/2001 |
|---|---|---|
| DE | 202008000247 U1 | 3/2008 |
| DE | 202016004423 U1 | 8/2016 |
| ES | 2213463 A | 8/2004 |
| FR | 2645785 A1 | 10/1990 |
| GB | 2348159 A | 2/1999 |
| GB | 2342059 A | 4/2000 |
| GB | 2365411 A | 9/2000 |
| GB | 2482510 A | 2/2012 |
| WO | 9924217 A1 | 5/1999 |

OTHER PUBLICATIONS

International Search Report for corresponding International Application No. PCT/SE2017/051000 dated Dec. 15, 2017.
Written Opinion of the International Searching Authority for corresponding International Application No. PCT/SE2017/051000 dated Dec. 15, 2017.

DRILL DUST RECEPTACLE AND BLANK THEREFORE

This application is a national phase of International Application No. PCT/SE2017/051000 filed Oct. 11, 2017 and published in the English language, which claims priority to Swedish Application No. 1651342-6 filed Oct. 13, 2016, both of which are hereby incorporated by reference.

TECHNICAL FIELD

The present disclosure relates to a drill dust receptacle for collecting drill dust formed at drilling of a hole in a surface. The present disclosure also relates to a blank for a drill dust receptacle.

BACKGROUND ART

Drilling of holes in walls creates drill dust or drill cuttings which fall from the hole down onto the ground. Cleaning up the drill dust is often laborious, especially when drilling indoors where the drill dust may stick to the wall or the floor, for instance.

To avoid cumbersome cleaning operations after drilling there are drill dust receptacles available. Such receptacles may be attached to the wall where a hole is to be drilled and collect the drill dust during drilling. After completed drilling the receptacle is sealed and disposed.

GB2482510 is an example of a receptacle for collecting drill dust and is made from a sheet of cardboard which comprises four foldable sections and a glue tab which connects the first and the last foldable section. To assemble the receptacle, the foldable sections are folded along fold lines and finally the first and the last foldable section are attached to each other by the glue tab. The design of the cardboard blank for the receptacle is complex and comprises several specific cuts to form the glue tab. The complicated design of the blank and the additional glue of the glue tab adds cost to the receptacle. In addition it is cumbersome to assemble the blank into a receptacle since the glue tab may get stuck on unwanted places.

FR2645785 shows a receptacle for collecting drill-dust. The receptacle is manufactured from a blank of irregular polygonal cross-section to allow forming the receptacle into a shape that allows it to be used in the corner between two walls. In addition, fastening means such as metal clamps are employed to lock sections of the blank at the tip of the drill-dust receptacle.

Thus, it is an object of the present disclosure to provide an improved drill dust receptacle which solves at least one problem of the prior art. In particular it is an object of the present disclosure to provide a drill dust receptacle which is of simple design and that may be produced at low cost. A further object of the present disclosure is to provide a blank for a drill dust receptacle which is of simple design and that easily may be assembled into a receptacle in few operations.

SUMMARY OF THE INVENTION

According to a first aspect of the present disclosure at least one of these objects are met by a drill dust receptacle 1 for collecting drill dust 2 formed at drilling of a hole in a surface wherein the drill dust receptacle 1 is formed of a blank 4 of foldable sheet material and is configured to be detachable attached to a surface, wherein the drill dust receptacle 1 comprises a receptacle portion 1.1 for holding drill dust having an upper edge 50 and a pointed bottom 40 and further comprises a front panel 20, a back panel 21 and a first and a second side section 22, 23, wherein the first and the second side section 22, 23, respectively, are coupled to the front and back panel 20, 21 by a joint 60 and wherein
the first and a second side section 22, 23, respectively, comprises a first and a second side panel 24, 25 coupled by a joint 60, such that the front panel 20 may be folded out from the back panel 21 and;
the joints 60 are formed by folds 31, 32, 33 in the foldable sheet material extending between first and second positions on the upper edge (50) of the receptacle portion 1.1 and intersecting in the pointed bottom 40 of the receptacle portion 1.1, characterized in that the receptacle portion 1.1 is formed of a rectangular receptacle section 10 of the blank 4 of foldable sheet material.

In the drill dust receptacle of the present disclosure, all joints of the receptacle portion are formed by folds in the rectangular foldable sheet material, which results simple, inexpensive and functional drill dust receptacle since no auxiliary joining means such as glue is necessary for its realization. A further advantage of the drill dust receptacle of the present disclosure is that the respective side sections of the receptacle portion are divided by a fold into at least a first and a second side panel. This makes the side sections foldable which in results in that the drill dust receptacle may be achieved in advance and then collapsed into a flat and thin packet which occupies little space in storage. The collapsing feature of the drill dust receptacle was an unexpected additional result of achieving the drill dust receptacle from a sheet material blank by folding.

Thus, the drill dust receptacle of the present disclosure is seamless. Moreover, it is free of any other joints than folds for coupling the front panel, the back panel, the side sections or the side panels.

According to a second aspect of the present disclosure at least one of the above objects are met by a blank 4 for a drill dust receptacle 1 for collecting drill dust 2 formed at drilling of a hole in a surface, wherein the blank 4 is formed of foldable sheet material and comprises an attachment section 11 configured to be detachable attached to a surface and a receptacle section 10 comprising a peripheral edge 50, wherein the receptacle section 10 comprises at least three fold lines 31, 32, 33, respectively extending between a first and a second position on the peripheral edge 50 and intersecting in an intersectional point 40 such that the fold lines 31, 32, 33 divides the receptacle section 10 into at least a front panel 20, a back panel 21, and a first and a second side section 22, 23 having, respectively, a first and a second side panel 24, 25, wherein the fold lines 31, 32, 33 are arranged such that the receptacle section 10 may be folded along the fold lines 31, 32, 33 such that the front panel 20, the back panel 21, and the first and a second side section 22, 23 form a receptacle portion 1.1 for holding drill dust characterized in that the receptacle section 10 is rectangular.

By "fold lines" alternatively "crease lines" are meant embossments in the sheet material or folds or creases in the sheet material or markings on or in the sheet material indicting the position of the folds. By "receptacle" is meant a container capable of receiving and holding drill dust within its limits.

The provision of at least three intersecting fold lines on the sheet material blank makes is possible to fold the blank into a receptacle portion suitable for collecting drill dust. Thus, an advantage of the blank may according to the present disclosure is that it is formable into a drill dust receptacle only by folding the sheet material along the fold lines.

Further features and alternatives of the drill dust receptacle and the blank of the present disclosure are disclosed in the detailed description and the appended claims.

DETAILED DESCRIPTION OF EMBODIMENTS

The drill dust receptacle and the blank for a drill dust receptacle according to the present disclosure will now be described more fully hereinafter. The drill dust receptacle and the blank according to the present disclosure may however be embodied in many different forms and should not be construed as limited to the embodiments set forth herein. Rather, these embodiments are provided by way of example so that this disclosure will be thorough and complete, and will fully convey the scope of the present disclosure to those persons skilled in the art. Same reference numbers refer to same elements throughout the description.

Figure 1:
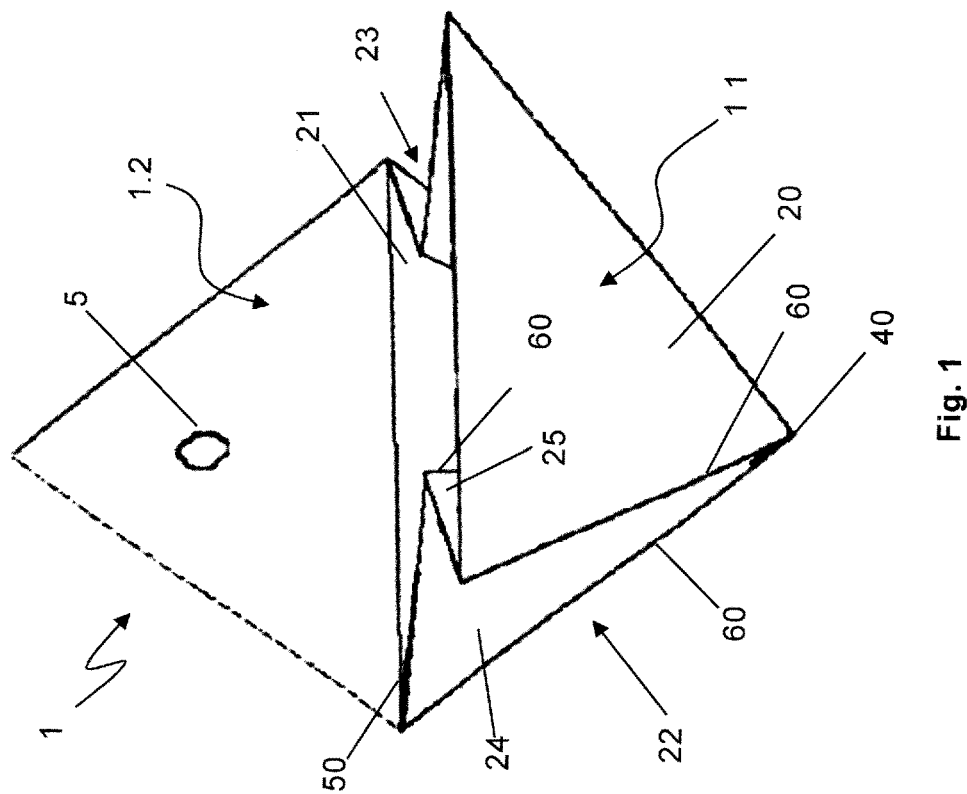
FIG. 1: A schematic drawing of a drill dust receptacle according to a first preferred embodiment of the present disclosure.

FIG. 1 shows a drill dust receptacle 1 according to a first preferred embodiment of the present disclosure. The drill dust receptacle 1 is manufactured from foldable sheet material. That is, a flat sheet of a material that can be folded into permanent folds. For example, the drill dust receptacle is manufactured from paper, such 80 g paper. In the following the "drill dust receptacle" is referred to as the "receptacle".

The drill dust receptacle 1 comprises a receptacle portion 1.1. The receptacle portion 1.1 has a pointed bottom 40 and an upper edge 50 and a front panel 20, a back panel 21 and a first and a second side section 22, 23 respectively having a first and a second side panel 24, 25 (in FIG. 2, only the left hand side panels are indicated). The drill dust receptacle 1 may further comprises an attachment portion 1.2 which is configured to be releasable attached to a surface (not shown) in which a hole is to be drilled. The attachment portion 1.2 may be provided with an opening 5 for guiding the drilling operation. The first and the second side sections 22, 23 are respectively joined to the front panel 20 and to the back panel 21 by joints 60 which are formed by folds in the sheet material. Also the first and a second side panel 24, 25 are coupled to each other by a joint 60 formed by a fold. That is, the joints 60 are folds, or creases, in the sheet material.

According to the present disclosure, the receptacle portion 1.1 is formed from a rectangular receptacle section 10 of the blank 4 of foldable sheet material. This results in that the receptacle portion 1.1 has the shape of a hollow square pyramid with an open base. That is, the base of the pyramid is rectangular. The tip of the pyramid is formed by the pointed bottom 60 of the receptacle portion 1.1 and the open base of the pyramid is formed by the upper edge 50 of the receptacle portion 1.1. In detail, the receptacle portion 1.1 has the shape of a hollow square pyramid with first and second opposite sides formed by the front panel 20 and the back panel 21 and with third and fourth opposite sides formed by the first and the second side sections 22, 23 of the receptacle portion 1.1. The front and the back panels 20, 21 are planar, i.e. flat. The first and the second side sections 22, 23 are pleated. That is the first and the second side sections 22, 23 comprises first and second pleats in the form of at least the first and second side panels 24, 25.

The folds and the resulting joints as well as the shape and relationship of the different parts of the drill dust receptacle 1 will hereinafter be described with reference to FIG. 2 which shows a blank 4 for the drill dust receptacle 1 (in the following referred to as the "blank").

The blank 4 comprises a receptacle section 10 and an attachment section 11. The receptacle section 10 is rectangular and has a peripheral edge 50 comprising a longitudinal edge 51 and a first and a second lateral edge 53, 54. The receptacle section 10 further comprises a longitudinal side 52 from which the attachment section 11 extends.

It is appreciated that the drill dust receptacle 1 may not comprise an attachment section 11. In that case, the longitudinal side 52 forms a longitudinal edge.

The receptacle section 10 is divided by a first and a second fold line 31, 32 into a front panel 20 and a back panel 21 and a first and a second side section 24, 25. A third fold line 33 divides each of the first and the second side sections 22, 23 into a first and a second side panel 24, 25. Each fold line 31, 32, 33 extends thereby from a first position on the peripheral edge 50 to a second position on the peripheral edge 50. That is, in FIG. 2, the first fold line 31 extends from the corner between the longitudinal side 52 and the first lateral edge 53 to the diagonally opposing corner between the longitudinal edge 51 and the second lateral edge 54. The second fold line 32 extends from the corner between the longitudinal side 52 and the second lateral edge 55 to the diagonally opposing corner between the longitudinal edge 51 and the first lateral edge 53. The third fold line 33 extends from the middle of first lateral edge 53 to the middle of second lateral edge 54. The three fold lines 31, 32, 33 are arranged such that they intersect in an intersectional point 40. In FIG. 2 the intersectional point 40 is in the center of the rectangular receptacle section 10.

The front panel 20, the back panel 21 and the first and the second side panels 24, 25 of the opposing side sections 22, 23 have each triangular shape comprising a base and a vertex. The base of the side sections 22, 23 extend along the lateral side edges 53, 54, the base of the front panel 20 extends along the longitudinal edge 51 and the base of the back panel 21 extends along the longitudinal side 52 of the receptacle section 10. The vertex of the side sections 22, 23 and the vertex of the front panel 20 and the vertex of the back panel 21 meet in the intersectional point 40 of the receptacle section 10. When the blank 4 has been folded into a receptacle 1 (see FIG. 1) the vertices of the front panel 20, the back panel 21 and the side sections 22, 23 form the pointed bottom 40 of the receptacle portion 1.1.

The fold lines 31, 32, 33 form foldable joints 60 between the different sections and panels of the receptacle section 10. That is, the first side section 22 is coupled to the front panel 20 and the back panel 21 by a respective foldable joint 60. The second side section 23 is coupled to the front panel 20 and the back panel 21 by a foldable joint 60. The first and the second side panel 24, 25 of the first side section 22 are coupled to each other by a foldable joint 60 and the first and the second side panel 24, 25 of the second side section 22 are coupled to each other by a foldable joint 60.

The attachment section 11 is also of triangular form and has a vertex, a base and first and second edges 12, 13. The base extends along longitudinal side 52 of the receptacle section 10 that is, along the base of the back panel 21. Thus, the vertex of the attachment section 11 points away from the intersectional point 40. Preferably, the shape and size of the attachment section 11 corresponds to the shape and size of the front panel 20. This allows the attachment section 11 to be folded over the front panel after use of the receptacle and thereby close and seal the receptacle. The backside of the attachment section 11, which faces away from the front panel, is provided with layer of adhesive 14 for releasably attaching the drill dust receptacle 1 to a surface, such as a wall. When the blank 4 is folded into the drill dust receptacle 1, the attachment section 11 forms the attachment portion 1.2.

The adhesive layer 14 may be applied over the entire backside of the attachment section 11 or on a portion thereof. In FIG. 2, a preferred embodiment is shown in which the adhesive layer 14 is applied such that it occupies an area in the form of a triangle on the attachment section. The triangle of adhesive is arranged such that its base is parallel with the longitudinal side 52 of the receptacle section 10. The triangle of adhesive 14 may be centered on the attachment section 11. Preferably, the triangle of adhesive is centered around the opening 5 in the attachment section 11. The advantage thereof is that the triangular area of adhesive 14, during drilling, thereby provides a seal between the surface of the wall and the attachment section 11. Thereby ensuring that all drill dust falls into the receptacle section 1.1.

However, alternative configurations of the adhesive layer is possible. According to one alternative (not shown) the adhesive layer is strip shaped and extends from one edge 12 to the other edge 13 of the attachment section 11. According to a second alternative (not shown), the adhesive layer is in the form of a ring around the opening 5 in the attachment section 11.

The adhesive may be applied as liquid by brushing or spraying. It may also be applied in the form of a double coated adhesive tape. For example, the adhesive tape is "Removable Repositionable Tape 9425HT Clear" commercially available from the company 3M. The Tape 9425HT is 5.4 mil double coated tape with high tack acrylic adhesive 420 on one side and medium tack acrylic adhesive 1050 on the other side on a 58 lb. polycoated kraft paper liner with a PET carrier. However, other alternatives are within the scope of the skilled person.

The blank 4 may be manufactured by cutting the blank from a continuous sheet of material, such as a paper roll and embossing the fold lines into the cut out blank using a conventional embossing tool.

The blank 4 may be formed into a drill dust receptacle 1 having a receptacle portion 1.1 by first folding the first and the second side sections 22, 23 towards each other and then folding front and back panels 20, 21 towards each other. By folding of the blank 4 into a receptacle, the fold lines 31, 32, 32 are transformed into folds 31, 32, 33 in the receptacle portion 1.1.

FIG. 3*a*-3*f* shows the use of the drill dust receptacle 1 in a drilling operation.

In a first step 100 (see FIG. 3*a*) the drill dust receptacle 1 has been releasably attached to surface (not shown) and the front panel 20 is folded out.

In a second step 200 (see FIG. 3*b*) a hole is drilled in the surface by a bore machine 6. During drilling, drill dust 2 fall into the receptacle portion 1.1 and is collected therein.

Figure 3C:
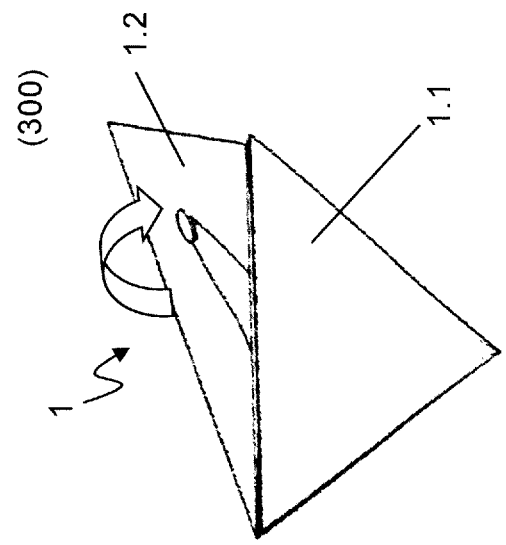
FIG. 3a-3f: Schematic drawings illustrating the drill dust receptacle according to the first preferred embodiment in use.
Figure 3B:
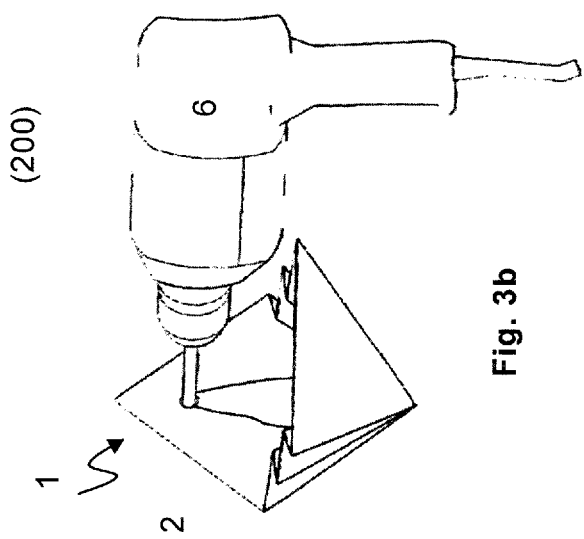
Figure 3A:
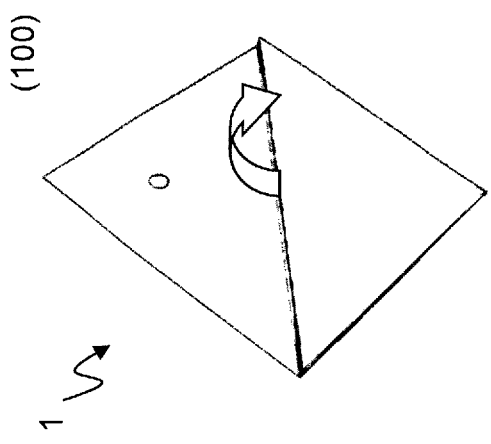
Figure 3D:
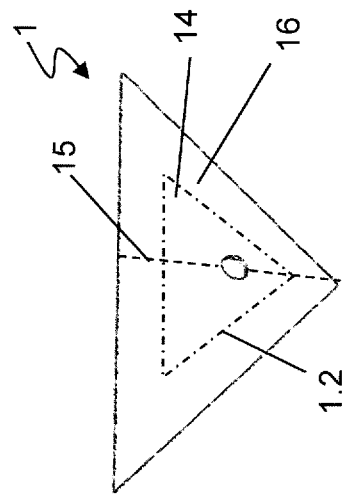
Figure 3E:
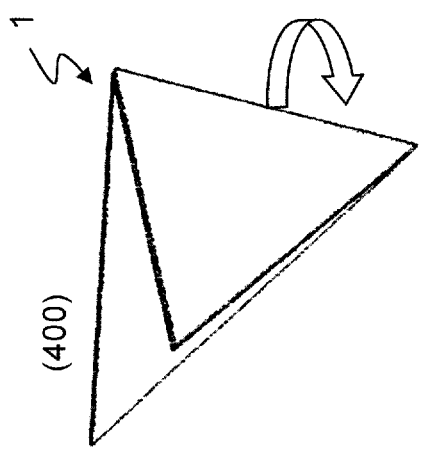

In a third step 300 (see FIG. 3*c*) when drilling of the hole is completed, the attachment portion 1.2 is folded over the front panel 20 of the receptacle portion 1.1, thereby closing the drill dust receptacle 1 (see FIG. 3*d*). The adhesive layer 14 on the backside 16 of the attachment portion 1.2 is now on the outer surface of closed drill dust receptacle 1.

Figure 3F:
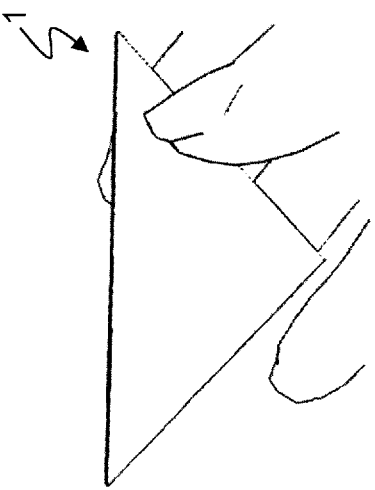

In a fourth step 400 (see FIG. 3*e*) the closed drill dust receptacle 1 is folded over its center line 15 which causes the adhesive on one side of the centre line 15 to adhere to the adhesive on the other side of the centre line 15. This results in effective sealing of the drill dust receptacle and prevents accidental opening of the drill dust receptacle. FIG. 3*f* shows the folded and sealed drill dust receptacle 1.

Figure 4:
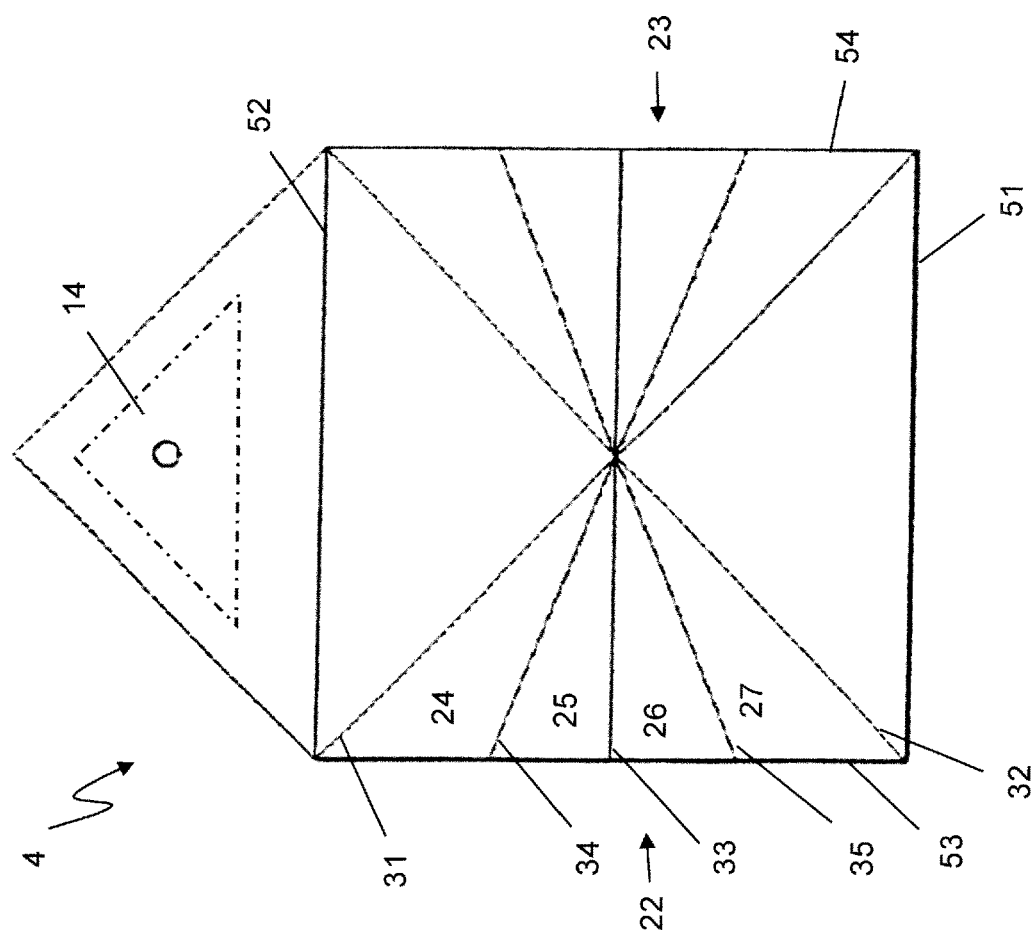
FIG. 4: A schematic drawing of a blank for a drill dust receptacle according to a second preferred embodiment of the present disclosure.

FIG. 4 shows a blank 4 for a drill dust receptacle 1 according to a second preferred embodiment of the present disclosure. The blank 4 of the second embodiment is identical to the blank 4 of the first embodiment with the additional features of a fourth and a fifth fold line 34, 35 which, together with the first, second and third fold lines 31, 32, 33, divide the first and the second side sections 22, 23 into four side panels 24, 25, 26, 27.

The fourth fold line 34 extends from a position on the first lateral edge 53 which is between the middle of the first lateral edge 53 and the corner between the longitudinal side 52 and the first lateral edge 54. The fourth fold line 34 extends to a position on the second lateral edge 54 which is between the middle of the second lateral edge 54 and the corner between the longitudinal edge 51 and the second lateral edge 54.

The fifth fold line 35 extends from a position on the first lateral edge 53 which is between the middle of the first lateral edge 53 and the corner between the longitudinal edge 51 and the first lateral edge 53. The fifth fold line 35 extends to a position on the second lateral edge 54 which is between the middle of the second lateral edge 54 and the corner between the longitudinal side 52 and the second lateral edge 54.

Figure 5:
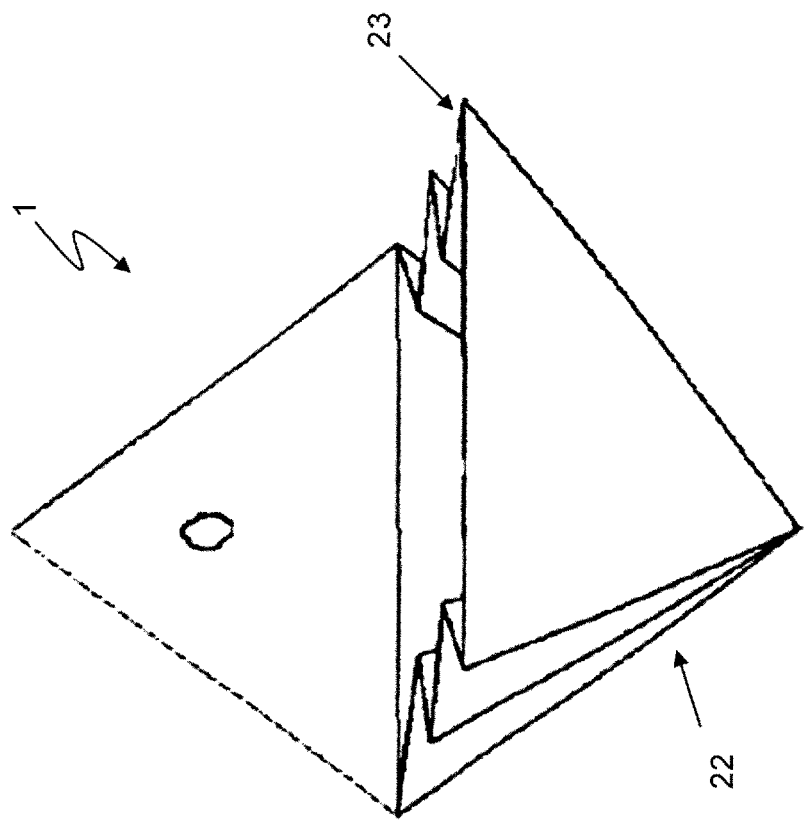
FIG. 5: A schematic drawing of a drill dust receptacle according to a second preferred embodiment of the present disclosure.

FIG. 5 shows a drill dust receptacle 1 according to the second embodiment. The advantage of dividing the side sections 22, 23 into further side panels is that the interior space delimited by the receptacle becomes more uniform. This reduces the risk of drill dust falling outside the receptacle.

In accordance with the description of above, the drill dust receptacle 1 according to the second embodiment comprise a receptacle portion 1.1 which is formed from a rectangular receptacle section 10 of the blank 4 of foldable sheet material. Thus also in this second embodiment the receptacle portion 1.1 has the shape of a hollow square pyramid with an open base and first and second opposite sides formed by the front panel 20 and the back panel 21. Likewise the third and fourth opposite sides are formed by the first and the second side sections 22, 23 of the receptacle portion 1.1 which are pleated. That is the first and the second side sections 22, 23 comprises four pleats in the form of the first, second, third and fourth side panels 24, 25, 26, 27.

Figure 6:
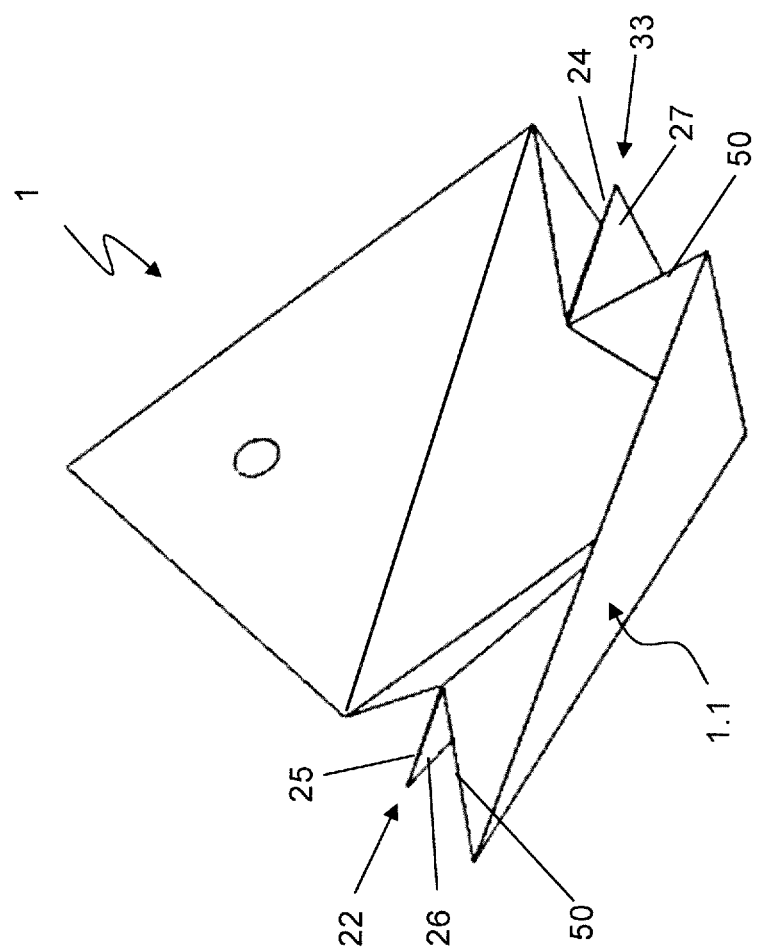
FIG. 6: A schematic drawing of a drill dust receptacle according to an alternative of the second embodiment of the present disclosure.

FIG. 6 shows an alternative of the drill dust receptacle 1 according to the second embodiment. In the embodiment shown in FIG. 6, the faces (i.e. the inner surfaces) of second and third panel 25, 26 of each side section 22, 23 have been attached to each other by adhesive (not shown) that is applied to one or both of the second and third panels 25, 26. The second and third panels 25, 26 may thereby be permanently attached to each other or releasably attached to each other. This causes the upper edge of the side sections 22, 23 of the receptacle portion 1.1 to become more straight than in the drill-dust receptacle shown in FIG. 5. The advantage thereof is that the receptacle portion 1.1 stand more erect when folded out and thus becomes deeper and may hold more drill dust.

Although a particular embodiment has been disclosed in detail this has been done for purpose of illustration only, and is not intended to be limiting. In particular it is contemplated that various substitutions, alterations and modifications may be made within the scope of the appended claims.

Figure 2:
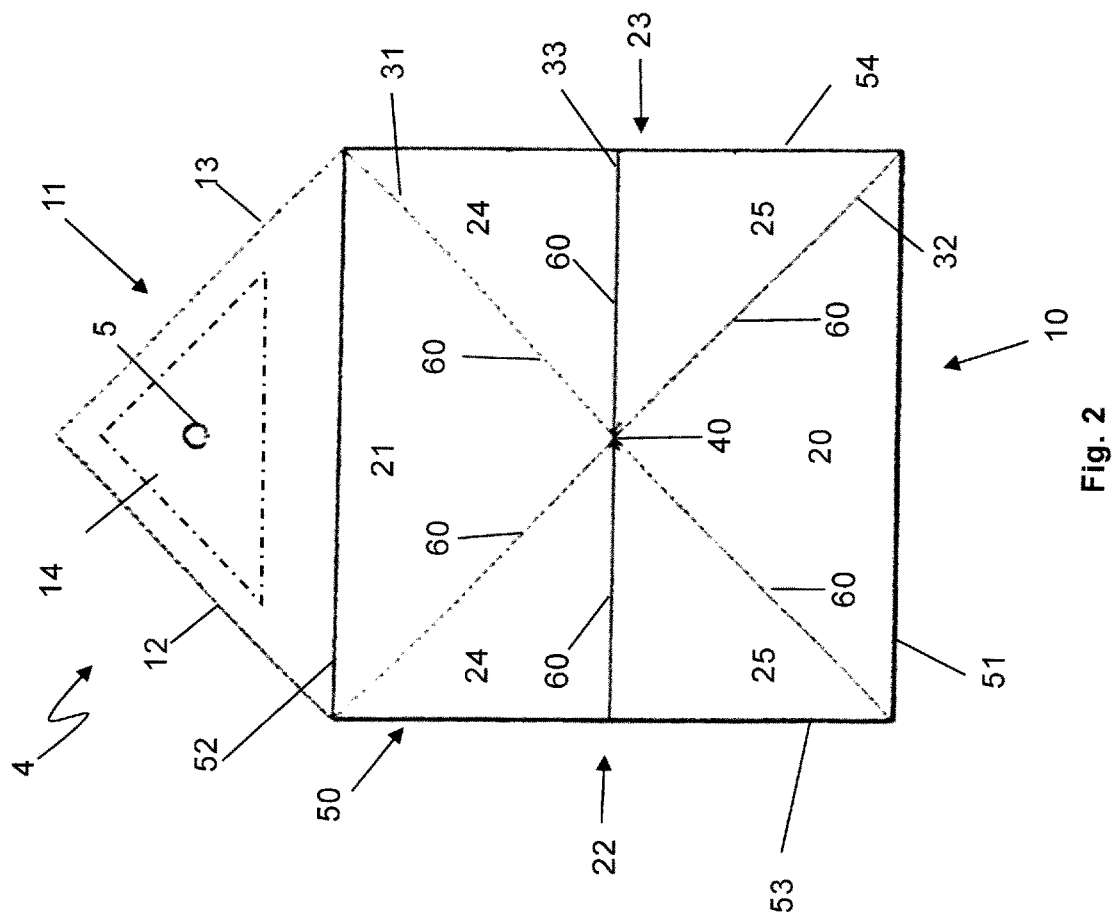
FIG. 2: A schematic drawing of a blank for a drill dust receptacle according to a first preferred embodiment of the present disclosure.

For example, the receptacle section 10 of the blank 1 may be of elongated rectangular shape rather than of quadratic shape as shown in FIG. 2. It is also possible to arrange the fold lines such that they intersect in a position other than in the center of the receptacle section.

It is further appreciated that in embodiments (not shown) one or more of the fold lines 31-35 may extend into the attachment section 11. In that case, a portion of the side edges 13, 14 of the attachment section 11 are comprised in the upper edge 50 of the receptacle 1.

Moreover, although specific terms may be employed herein, they are used in a generic and descriptive sense only and not for purposes of limitation. Furthermore, as used herein, the terms "comprise/comprises" or "include/includes" do not exclude the presence of other elements. Finally, reference signs in the claims are provided merely as a clarifying example and should not be construed as limiting the scope of the claims in any way.

The invention claimed is:

1. A drill dust receptacle for collecting drill dust formed at drilling of a hole in a surface wherein the drill dust receptacle is configured to be a single folded blank of foldable sheet material and is configured to be detachably attached to a surface, wherein the drill dust receptacle comprises a receptacle portion for holding drill dust having an upper edge and a pointed bottom and further comprises a front panel, a back panel and a first and a second side section, wherein the first and the second side section, respectively, are coupled to the front and back panel by a joint, and wherein;

the first and a second side section, respectively, comprises at least a first and a second and a third and a fourth side panel, wherein the first and the second side panel are coupled by a joint and the second and the third side panel are coupled by a joint and the third and the fourth side panel are coupled by a joint, such that the front panel may be folded out from the back panel and;

the joints of the receptacle portion are formed by folds in the single folded blank of sheet material extending between first and second positions on the upper edge of the receptacle portion and intersecting in the pointed bottom of the receptacle portion, wherein the receptacle portion comprising the front panel, the back panel and the at least four side panels is configured to be the single folded blank of the foldable sheet material by folding a rectangular receptacle section of the single folded blank;

the front panel, the back panel and the first and second side section, respectively, have a triangular shape comprising a base and a vertex, wherein the vertices meet in the pointed bottom of the receptacle.

2. The drill dust receptacle according to claim 1, comprising an attachment portion, wherein the attachment portion has a back side comprising a layer of releasable adhesive for detachably attaching the attachment portion to a surface.

3. The drill dust receptacle according to claim 2, wherein the layer of adhesive occupies a triangular area on the attachment portion.

4. The drill dust receptacle according to claim 2, wherein the attachment portion has triangular shape comprising a base and a vertex, wherein the attachment portion extend from the back panel.

5. The drill dust receptacle according to claim 4, wherein the front panel, the back panel, the first and second side section, and the attachment portion have the shape of isosceles triangles and wherein the base of the attachment portion is coupled to the base of the back panel such that the attachment portion may be folded over the front panel.

6. The drill dust receptacle according to claim 1, wherein the receptacle portion has the shape of a square pyramid.

7. The drill dust receptacle according to claim 6, wherein the receptacle portion has the shape of a square pyramid, with first and second opposing sides formed by the front panel and the back panel and third and fourth opposing sides formed by the first and second side section.

8. The drill dust receptacle according to claim 7, wherein the front and back panel are planar.

9. The drill dust receptacle according to claim 7, wherein the first and second side section are pleated.

10. The drill dust receptacle according to claim 1, wherein the faces of the second and the third side panel of each side section are attached to each other.

\* \* \* \* \*